July 2, 1968     S. C. VERDI     3,390,895

AUXILIARY AXLE SUSPENSION

Filed March 25, 1966     2 Sheets-Sheet 1

SAM C. VERDI
INVENTOR.

BY Edward M. Apple
ATTORNEY

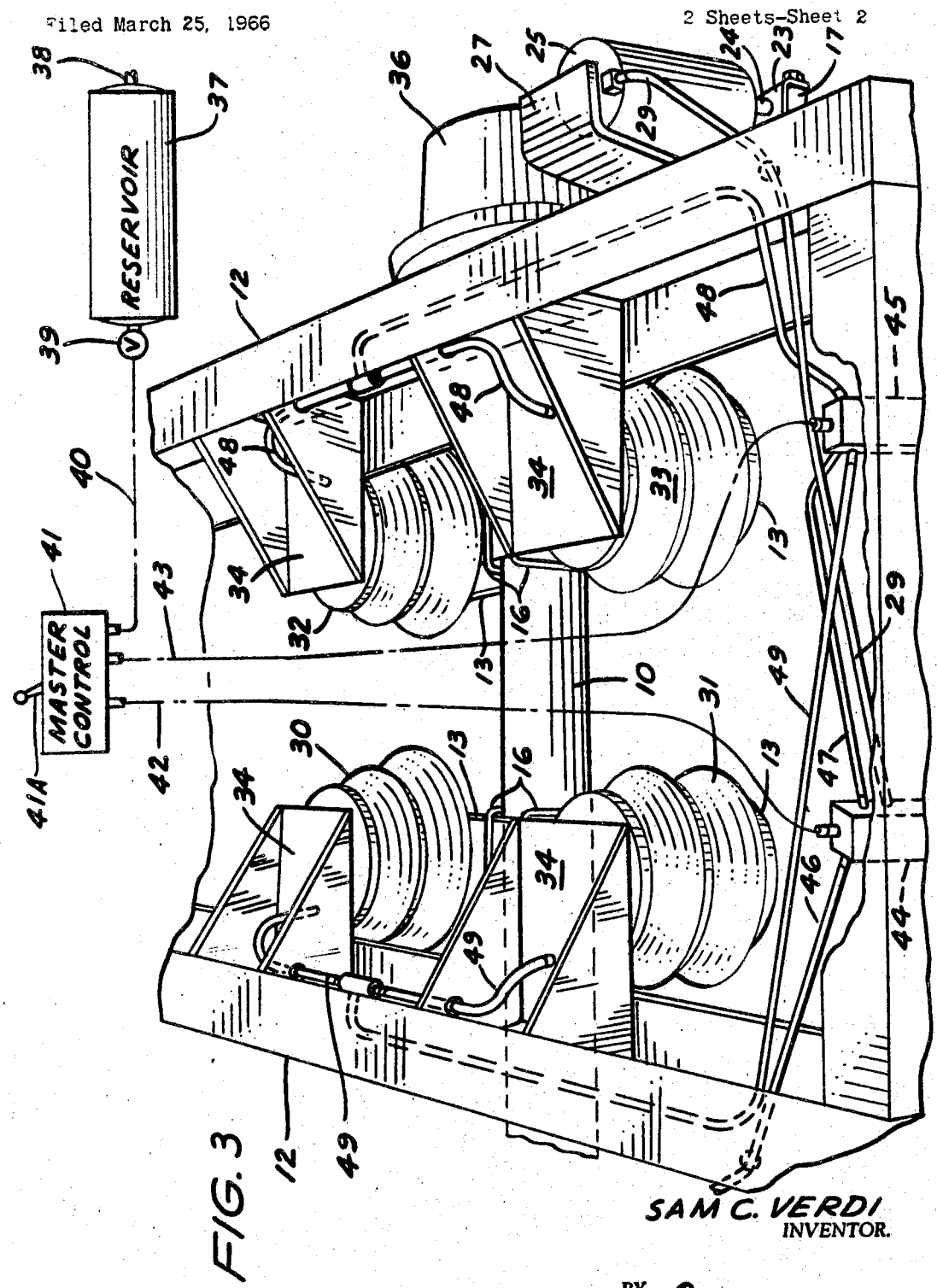

3,390,895
AUXILIARY AXLE SUSPENSION
Sam C. Verdi, 12201 Rutherford,
Detroit, Mich. 48227
Filed Mar. 25, 1966, Ser. No. 542,179
6 Claims. (Cl. 280—124)

ABSTRACT OF THE DISCLOSURE

A vehicle having a frame and an auxiliary axle supported by air springs and a semi-elliptical leaf spring pivoted intermediate its ends to the frame with one end secured to the axle and the other end to an air operated motor, so that the axle may be raised and resiliently supported when the vehicle is lightly loaded, the air springs and motor using the same air supply.

---

Figures 1, 2:
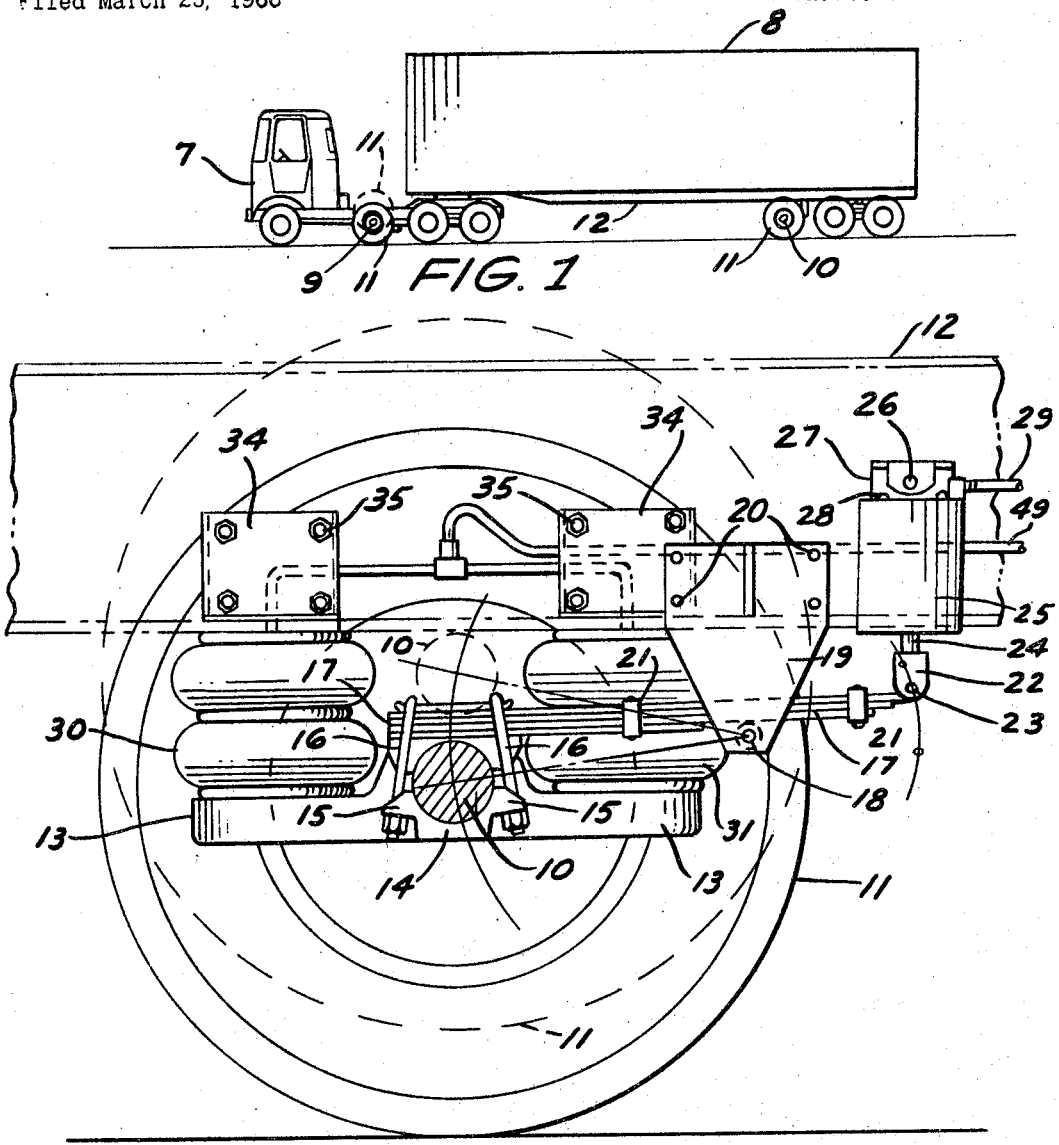

This invention relates to motor vehicles and has particular reference to an auxiliary axle suspension for heavy trucks and trailers.

An object of the invention is to generally improve devices of the character indicated and to provide an auxiliary axle suspension, which is simple in construction, economical to manufacture and efficient in operation.

In the trucking industry it is desirable to distribute the heavy loads over as much road area as possible. In order to accomplish such a purpose it has become the practice in the industry to add one or more auxiliary axles and rubber tired wheels to the load carrying vehicle, whether it be a tractor-trailer combination or a truck. When returning empty after a heavy haul, it is equally desirable to lift the auxiliary axles and wheels, so that the auxiliary tires are out of contact with the road, whereby to insure that the expensive tires are free from unnecessary wear, tear and other hazards of the road.

Devices now known to the public for such purposes are invariably cumbersome and expensive and embody a great deal of dead and unsprung weight when in elevated position. Some of the presently known devices are elevated by hand cranking, or embody other forms of mechanism to raise them.

It is therefore an object of this invention to obviate the foregoing difficulties and to provide a suspension system which has many advantages over the devices now on the market.

Another object of the invention is the provision of a suspension system of the character indicated, which is power operated and remotely controlled, so that the driver may raise and lower the auxiliary wheels without getting down from his driving position in the cab.

Another object of the invention is the provision of an auxiliary axle suspension system which is spring balanced and controlled in both raised and lowered positions.

A further object of the invention is to provide a power operated auxiliary axle suspension system, which may be connected into the conventional air brake system of the motor vehicle.

Another object of the invention is to provide a power operated system of the character indicated, which is combined with conventional load carrying air springs and has closed power circuits, so that compressed air may be exhausted from the load carrying air springs and diverted into air cylinders for elevating the auxiliary axles and wheels, and vice versa.

Another object of the invention is to provide an auxiliary axle suspension system, which provides the said axle with air spring support when under load and under normal operating conditions and resiliently supports the dead weight of the same axle, when in elevated position and not under load.

Another object of the invention is to provide an auxiliary axle of the character indicated with a pivotable leaf spring lever for elevating the axle and resiliently supporting it when not under vehicle load.

Another object of the invention is to provide an auxiliary axle of the character indicated which is mounted at the end of a power actuated pivotable, leaf spring lever for elevating and lowering the axle.

The foregoing and other objects and advantages of the invention will become more apparent as the description proceeds, reference being made from time to time to the accompanying drawings, forming part of the within disclosure, in which drawing:

FIG. 1 is a side elevational view of a tractor trialer combination which is equipped with the device embodying the invention.

FIG. 2 is an enlarged side elevational view with parts broken away and parts in section, illustrating an auxiliary axle suspension device embodying the invention. In this view the near wheel is removed. The broken lines show the position of the tires, wheels, and axle when in elevated position.

FIG. 3 is a perspective view, with parts broken away, showing the auxiliary axle with wheels and tires removed, and illustrating the suspension means and schematically illustrating the suspension controls.

Referring now more particularly to the drawings it will be understood that in the embodiment herein disclosed the reference characters 7 and 8 indicate a conventional tractor trailer combination, which is equipped with devices embodying the invention. In this view I illustrate the tractor 7 as having an auxiliary axle, as at 9, which is shown in elevated position, and the trailer 8 as having an auxiliary axle as at 10, which is in normal load carrying position. Each of the axles 9 and 10 is provided with conventional wheels and tires 11. Each of the axles 9 and 10 is provided with the suspension means illustrated in FIGS. 2 and 3.

In FIG. 2 I illustrate the axle 10 as being in the normal load carrying position, and with broken lines illustrating the axle 10 in its elevated and non-load carrying position.

Each of the axles 9 and 10 has similar suspension means, as illustrated in FIG. 2, so that a description of the suspension means applied to axle 10 will suffice for both.

In FIGS. 2 and 3 the reference character 12 indicates the frame of the trailer 8, to which the suspension means are connected.

The axle 10 is supported on a pair of members 13, each of which has a saddle portion 14 for receiving the axle. Each saddle portion 14 has extensions 15, which are bored to receive the ends of U-bolts 16, which are mounted over a semi-elliptical leaf spring 17, the latter being pivoted as at 18 in brackets 19, secured to the frame 12 by bolts 20, or other suitable means.

The leaves of the spring 17 are held in alignment by conventional spring retainers 21.

It will be noted that the leading end and the greater portion of the length of the leaf spring 17 is ahead of the pivot point 18. Secured to the trailing end of the leaf spring 17 is a clevis 22, which is pivoted to the spring 17, as at 23, and is secured to the end of a push rod 24, which in turn is secured to the piston (not shown) of an air cylinder 25, which in turn is pivoted, as at 26, to a bracket 27, which is bolted, as at 28, to the frame 12.

The air cylinder 25 is connected through an airline 29 to the compressed air system of the vehicle.

The mechanism just described is used for lifting the auxiliary axle 10 and its pair of wheels off of the ground when the trailer 8 is not under load. When the axle 10 and its wheels and tires are lifted off the ground, as shown by the broken lines in FIG. 2, the axle and wheels will be carried as dead weight by the leaf springs 17, which are under air pressure as hereinafter described.

In order to provide the auxiliary axle with resilient means when under load, I provide for each axle four conventional air springs 30, 31, 32 and 33 (FIG. 3). The air springs 30–33 are airtight bellows-like rubber elements, which are mounted as shown in FIG. 2, between the member 13 and brackets 34, which are bolted, as at 35, to the frame 12. The air springs 30–33 are the load carrying means when the axle 10 and its wheels and tires are under load, as shown in FIG. 2.

In FIG. 3 I illustrate the arrangement of the axle 10 and the air springs 30–33 with relation to the frame of the trailer. In this view a wheel drum 36, with the wheel and tire removed, is shown at the end of the auxiliary axle 10. In this view I also schematically show one of the air cylinders 25 and its airline 29 in relation to the compressed air system of the vehicle.

In the compressed air system the reference character 37 indicates the air reservoir which is supplied with compressed air through the line 38, which in turn is connected to the vehicle air compressor. A shutoff valve is indicated as at 39. An airline 40 extends from the reservoir to a master control 41, which is preferably positioned in the cab of the tractor. The master control 41 connects through air lines 42 and 43 with control valves 44 and 45, which are arranged to distribute the compressed air alternately to the air cylinders 25 and the air springs 30–33. The control valve 44 connects to one air cylinder 25 through the airline 29 and to the other air cylinder 25 through the airline 46. The control valves 44 and 45 connect through the airlines 47 and 48 to the air springs 32 and 33, and the control valve 45 connects through the airline 49 to the air springs 30 and 31.

In operation the device functions as follows. When the tractor trailer 7–8 is under load and it is desired to use the auxiliary axles and suspension systems the control lever 41A is thrown in one direction, so that the compressed air is directed through the control valves 44 and 45 to the air spring 30–33. When the air springs 30–33 are under air pressure the air cylinders 25 are relieved of the air pressure and the air cylinders 25 are rendered inoperative. When the vehicle is on a return trip and not under load and it is desired to lift the auxiliary axles 9 and 10, and the wheels and tires out of load carrying positions, the master control lever 41 is thrown in the opposite direction, which causes the compressed air to be exhausted from the air springs 30–33 and directed through the control valves 44 and 45 into the air cylinders 25, causing downward pressure to be exerted on the push rods 24 and the trailing end of the springs 17, causing the springs to pivot on the pivots 18 and lift the axle 10 into non-load carrying position.

Although I have herein described the use of compressed air to actuate the air cylinders and air springs, it is within the contemplation of the invention to use a hydraulic fluid in place of the compressed air.

It is believed that the operation of the device is obvious from the foregoing description.

Having described my invention, what I claim and desire to secure by Letters Patent, is:

1. In a device of the character described, the combination with a vehicle having a frame of an auxiliary axle, means to resiliently support in elevated position said axle with respect to said frame, when said frame is not under load, air springs mounted to said axle and said frame and arranged to assist in the support of said frame when the said frame is under load, said support means for said axle including a semi-elliptical leaf spring pivoted intermediate its ends to a bracket secured to said frame, one end of said leaf spring being secured to said axle and the other end of said leaf spring being pivoted to the push rod of a power cylinder suported by said frame.

2. The structure of claim 1, in which the said power cylinder and said air springs are in communication with a supply of compressed air, there being control means for said compressed air which may alternately direct the compressed air into said air springs and said power cylinder.

3. The structure of claim 1, in which said leaf spring is pivoted to said bracket at a point on said spring, which is farther removed from said axle than it is from said power cylinder.

4. The structure of claim 1, in which the immediate supply of compressed air for said air spring and said power cylinder is in a closed circuit and said control means are arranged to supply air to said air springs while is it being exhausted from said power cylinder and vice versa.

5. The structure of claim 1, in which each end of said axle is supported at the end of a power actuated leaf spring, there being members extending forwardly and rearwardly from said axle for supporting said air springs and through them said frame.

6. The combination with a motor vehicle having a frame and a compressed air system, of an auxiliary axle suspended from said frame, a plurality of air springs positioned between said frame and said axle for helping support said frame on said axle when under load and a leaf spring secured to said axle and pivoted to means on said frame and pivoted to the push rod of an air cylinder adapted to elevate said axle when said frame is not under load, said air springs and said cylinder being connected through control means with said air system.

References Cited

UNITED STATES PATENTS 3,201,141  8/1965  Bernstein.
3,309,107  3/1967  Chieger _____ 280—124

PHILIP GOODMAN, *Primary Examiner.*